United States Patent [19]
Mammone et al.

[11] Patent Number: 5,703,908
[45] Date of Patent: Dec. 30, 1997

[54] FIXED REFERENCE SHIFT KEYING MODULATION FOR MOBILE RADIO TELECOMMUNICATIONS

[75] Inventors: Richard J. Mammone, Bridgewater, N.J.; Kevin Farrell, Milford, Conn.; Brian Freeman, Howell, N.J.

[73] Assignee: Rutgers University, Piscataway, N.J.

[21] Appl. No.: 356,019

[22] Filed: Dec. 14, 1994

Related U.S. Application Data

[63] Continuation of Ser. No. 133,719, Oct. 8, 1993, abandoned.
[51] Int. Cl.$^6$ .................................................. H04L 27/10
[52] U.S. Cl. ........................... 375/278; 375/284; 375/322; 375/325; 375/329; 375/334; 375/349; 370/500; 370/526; 329/300; 329/304; 329/345
[58] Field of Search .................................. 375/271, 278, 375/279–285, 322, 324, 325, 329, 330, 334, 346, 347, 349; 455/65, 214, 300; 329/304, 345; 370/491, 500, 522, 525, 526, 527

[56] References Cited

U.S. PATENT DOCUMENTS

| | | | |
|---|---|---|---|
| 3,104,393 | 9/1963 | Vogelman | 343/200 |
| 3,119,964 | 1/1964 | Crafts | 325/30 |
| 3,435,343 | 3/1969 | Pierret | 325/389 |
| 3,766,480 | 10/1973 | Belloc et al. | 375/329 |
| 3,813,598 | 5/1974 | Stuart | 325/49 |
| 4,158,105 | 6/1979 | Otani et al. | 375/322 |
| 4,531,223 | 7/1985 | Ashida | 375/110 |
| 4,581,586 | 4/1986 | Rubin | 375/324 |
| 4,860,319 | 8/1989 | Yoshida | 329/302 |
| 4,912,773 | 3/1990 | Schiff | 455/71 |
| 4,942,592 | 7/1990 | Leitch et al. | 375/329 |
| 5,068,876 | 11/1991 | Yoshikawa et al. | 375/329 |
| 5,303,269 | 4/1994 | Altes | 375/329 |
| 5,539,355 | 7/1996 | Nakamura | 329/302 |

OTHER PUBLICATIONS

Brian D. Freeman et al, "Fixed Reference Shift Keying Modulation for Mobile Transmission in a Fading Channel Environment", 1992, pp. 0707–0711, 1992 IEEE.

E. Gilbert, "Mobile Radio Diversity Reception," The Bell System Technical Journal, pp. 2473–2492, Sep. 1969.

P. Balaban and J. Salz, "Dual Diversity Combining and Equalization in Digital Cellular Mobile Radio," IEEE Transactions on Vehicular Technology, vol. 40, No. 2, pp. 342–354, May 1991.

A. Fineberg and R. Mammone, "Detection and Classification of Multicomponent Signals," IEEE 25th Asilomar Conference on Signals, Systems and Computers, Nov. 1991.

Takeshi Hattori and Hiroshi Suzuki, "Technological State of the Art and Future Trends of High–Speed Digital Mobile Communications," 1989 IEEE Globecom, pp. 3.1–3.1.6, 1989.

T.S. Rappaport, S.Y. Seidel, and R. Singh, "900 MHZ Multipath Propagation Measurements for U.S. Digital Cellular Radiotelephone", 1989 IEEE, Globecom, pp. 3.2.1–3.2.6, 1989.

C.P. O'Donoghue, C.J. Burkley, and M. O'Droma, "The Performance of GTFM in a Frequency Selective Rayleigh Fading Channel," 1989 IEEE 39th Vehicular Technology, pp. 878–883, 1989.

P.J. Mclane, P.H. Wittke, P.K.–M. Ho, and C. Loo, "PSK and DPSK Trellis Codes for Fast Fading Shadowed Mobile Satellite Communication Channels," IEEE Transactions on Communications, vol. 36, No. 11, pp. 1242–1246. Nov. 1988.

(List continued on next page.)

Primary Examiner—Stephen Chin
Assistant Examiner—Amanda T. Le
Attorney, Agent, or Firm—Peter K. Trzyna

[57] ABSTRACT

A method and apparatus for improved mobile radio telecommunications employs the transmission of a pilot reference signal within the coherence band of the modulated carrier wave. The receiver in this system uses instantaneous phase estimation techniques of the pilot and carrier received waveforms to provide immunity from phase distortion introduced by the channel.

16 Claims, 2 Drawing Sheets

OTHER PUBLICATIONS

P. Bello, "Characterization of Randomly Time–Variant Linear Channels," IEEE Transactions on Communications Systems, vol. CS–11, pp. 360–393, Dec. 1963.

M. Simon, "Dual–Pilot Tone Calibration Technique," IEEE Transactions on Vehicular Technology, vol. VT–35, No. 2, pp. 63–70, May 1986.

F. Adachi, and K. Ohno, "BER Performance of QPDSK with Post Detection Diversity Reception in Mobile Radio Channels," IEEE Transaction on Vehicular Technology, vol. 40, No. 1, pp. 237–249, Feb. 1991.

I. Korn, "Error Probability of M–ary FSK with Differential Phase Detection in Satellite Mobile Channel," IEEE Transactions on Vehicular Technology, vol. 38, No. 2, pp. 76–85, May 1989.

G. D'Aria, L. Stola and V. Zingarelli, "Modeling and Simulation of the Propagation Characteristics of the 900 MHz Narrowband–TDMA CEPT/GSM Mobile Radio," IEEE 39th Vehicular Technology, vol. 2, pp. 631–639.

F. Garber and M. Pursley, "Performance of Binary FSK Communications Over Frequency–Selective Rayleigh Fading Channels," IEEE Transactions on Communications, vol. 37, No. 1, pp. 83–89, Jan. 1989.

N. Sollenberer, J. Chuang, S. Ariyavisitakul, and H. Arnold, "Architecture and Implementation of an Efficient and Robust TDMA Frame Structure for Digital Portable Communications," IEEE Transactions on Vehicular Technology, vol. 40, No. 1, pp. 250–260, Feb. 1991.

J. Doherty and R. Mammone, "A Robust Method of Channel Equalization for Mobile Communication Channels," Report of MILCOM–90 Monteray California, pp. 0643–0647, Nov. 1990.

H. Hashemi, "A Simulation Package for Digital Cellular Mobile Radio Applications," 1989 IEEE Globecom, pp. 0112–0117 CH2682–3/89/0000–0112.

W. Rummler, R. Coutts, M. Liniger, "Multipath Fading Channel Models for Microwave Digital Ratio," IEEE Communications Magazine, vol. 24, No. 11, pp. 30–42, Nov., 1986.

G. Ungerboeck, "Channel Coding with Multilevel/Phase Signals," IEEE Transactions on Information Theory, vol. IT–28, No. 1, pp. 55–67, Jan. 1982.

H. Suzuki, "A Statistical Model for Urban Radio Propagation," IEEE Transactions on Communications, vol. COM–25, No. 7, pp. 673–680, Jul., 1977.

J. McGeehan and A. Bateman, "Theoretical and Experimental Investigation of Feedforward Signal Regeneration as a Means of Combating Multipath Propagation Effects in Pilot Based SSB Mobile Radio Systems," IEEE Transactions on Vehicular Technology, vol. VT–32, No. 1, pp. 106–120, Feb. 1983.

J. McGeehan and D. Burrows, "Performance Limits of Feedforward Automatic Gain Control in Mobile Radio Receivers," IEEE Proceedings, vol. 128, Pt. F, No. 6, pp. 385–392, Nov. 1981.

J.McGeehan and A. Bateman, "Phase–Locked Transparent Tone–In–Band (TTIB): A New Spectrum Configuration Particularly Suited to the Transmission of Data Over SSB Mobile Radio Networks," IEEE Transactions on Communications, vol. COM–32, No. 1, Jan. 1984.

J. Cavers, "The Performance of Phase Locked Transparent Tone–in–Band with Symmetric Phase Detection," IEEE Transactions on Comm., V39, No.9, pp. 1389–1399, Sep. 1991.

F. Davarian, "High Performance Digital Communications In Mobile Channels," Proceedings IEEE 34th Vehicular Conference, pp. 114–118, 1984.

C. Stevenson, "An Improved Modulation Format and Signal Processing Scheme for ACSB Systems," Proceeding IEEE 34th Vehicular Conference, pp. 109–113, 1984.

S.O. Rice, "Mathematical Analysis of Random Noise," Bell System Technical Journal, vol. 23, pp. 282–332, Jul. 1944.

FIXED REFERENCE SHIFT KEYING MODULATION FOR MOBILE RADIO TELECOMMUNICATIONS

This is a continuation of application Ser. No. 08/133,719, filed Oct. 8, 1993, abandoned.

BACKGROUND OF THE INVENTION

A. Field of the Invention

The present invention relates to an improved modulation and demodulation technique and circuitry for increased performance in mobile radio telecommunications. More particularly, the invention relates to a communication system which employs the transmission of a pilot reference signal along with a of the modulated carrier wave within a predetermined coherence band. The receiver applies instantaneous phase estimation techniques on the received signals by using the difference of the instantaneous phase estimates of the pilot and carrier waveforms. The resultant relative phase measurement is used to ensure a degree of immunity from distortion which may be introduced into the channel.

B. Description of the Related Art

Mobile cellular radio telephone service is well known in the art. The initial concept was intended to increase the capacity of earlier radio telephone services and to provide remote access to telephone service from mobile locations such as cars, boats, and planes. One of the first mobile radio telecommunication systems was the Advanced Mobile Phone Service (AMPS) produced by Bell Systems in 1974. The AMPS system provided a higher capacity due for conveying information to its use of higher frequency carrier waves. However, an interesting characteristic of these higher frequency carrier waves was their rapid attenuation over a geographical area. Thus, an identical range of channel frequencies could be reused in adjacent geographical areas or "cells".

In conventional mobile cellular environments, the service subscriber has a mobile receiver that uses one of several possible channels to access a base unit. Base units are deployed at regularly spaced intervals across an area cell to provide reliable communication as-the mobile unit moves from one base unit's coverage area to another. Each base unit is physically connected via conventional landlines such as copper wire or fiber optic cable. The demand for these systems is outpacing their current capacity due to the mobility that the service provides and the increased accessibility to communication services.

Currently, mobile cellular telephone services is based upon channel assignments in a 40 MHz band in the 800 to 900 MHz frequency range (20 MHz for base station use and 20 MHz for mobile unit use). Each channel has a bandwidth assignment of 30 kHz. Accordingly, each geographical "cell" has a potential of 666 usable channels for base station use and 666 for mobile use. The channels are mapped into a grid or matrix of hexagonal cells to provide for reuse of channels over the operating area. Identical channels are not mapped into adjacent cells, and to avoid interference between the channels. To provide increased channels over a predetermined area, one method is to increase the number of cells per unit area.

Accurate demodulation of the received signal has often been difficult as a result of the time varying channel characteristics. The time varying distortion of a typical mobile radio channel is the result of the propagation loss and the multiplicative multipath fading phenomenon. The multiplicative multipath effect is caused by the scattering of the modulated signal by adjacent structures (buildings, other vehicles, etc.).

Scattering occurs as a result of low antenna heights relative to adjacent structures which are spaced at multiples of the carrier wavelength. Additionally, the wavelength of a typical mobile cellular channel is usually smaller than the cross sectional area of buildings or other structures so that total signal reflection occurs. This creates a main or direct path signal and various delayed and distorted copies of the signal at the receiving antenna.

Consequently, voice quality in cellular telephones has often been unsatisfactory. Increasing the signal power to improve performance has not been a viable option because signal power is limited by federal regulation. Additionally, signal power has been limited by practical channel assignment and reuse issues. Thus, the goal is to minimize the signal power for a fixed desired Bit Error Rate (BER): Minimizing the signal power allows channel frequencies to be reused within a shorter base station spacing, allowing for the increased capacity of the overall system. This is useful in meeting the growing demand for cellular telephone service.

The desire to increase the number of circuits per unit area is due to the greatly increased demand for cellular telephone service. In the future, the industry is heading toward a "Personal Communications Network" (PCN). This system would permit many individual subscribers in a city or building to have their own pocket mobile telephone. This type of wireless communication is expected to be extremely popular. Large demand will cause the number of required circuits per square block to become extremely large especially in large cities with highly concentrated business areas, such as New York, London, and Tokyo.

One potential solution to this problem is to reduce the power of the transmitted signal to permit further reduction in the base transmitter service area. This would allow more transmitters to be installed per block and would increase the available number of telephone circuits per block. However, this leads to lower signal to noise ratios.

The concept of PCN also places constraints on the physical size, weight, and power consumption of the individual personal transmitter and receiver units because each user would like to carry the personal communicator easily and not be tied down to a power source such as a wall outlet or automobile. Thus, there also is a need for an improved means to increase the density of allowable communications at a given power level within the PCN environment. In an attempt to solve this problem, various diversity techniques have been studied. Diversity techniques provide for redundant transmission of information so that information can be decoded in the presence of noise. Space, frequency, and time diversities have all been studied extensively for a solution to this increasingly important problem.

In one such system, a pilot signal and a modulated carrier signal were employed. This system is described in greater detail in E. Gilbert, "Mobile Radio Diversity Reception", The Bell System Technical Journal, Pg. 2473-2492, September 1969. The pilot signal and the modulated carrier were close enough in frequency so that both experienced the same distortion over the channel. An analog receiver would heterodyne the pilot and the carrier signals so that phase distortion could be cancelled out at the receiver. The pilot signal was used to eliminate the need for tracking the carrier frequency with a locally generated carrier signal. The modulation scheme employed by this system was frequency modulation due to the predominance of analog equipment at the time (1969). But pilot diversity with frequency modulation was prone to interference between the pilot signal and the upper and lower modulation frequencies of the carrier signal and thus has not been pursued further.

Another previously known scheme is known as Rake diversity. See W. C. Jakes, Jr., Ed., Microwave Mobile Communications, New York: Wiley, 1974. In Rake diversity, the same information is transmitted over several frequencies which are separated by sufficient bandwidth to ensure non-coherence of channel distortion. The receiver in these systems employed a variety of techniques (the most popular of the techniques involves maximal ratio combining, which combines the signals by weighing each according to its received signal to noise ratios and then summing) to obtain an estimate of the transmitted signal. This technique is called Rake because the spectrum of the radio frequencies across the band show a rake of carrier signals transmitted for any single information sequence. Rake is obviously not very bandwidth efficient, although it offers good performance. It has not been a viable solution in commercial systems due to the need to minimize frequency use in order to increase overall system capacity.

Space diversity is another diversity scheme which employs the use of multiple receiving antennas or multiple transmitting antennas to ensure independent propagation paths for the same signal. One example involves the use of two receiving antennas to ensure that the remote receiver receives an accurate transmission from the base station. Space diversity provides signals that experience different fading due to the different path propagation characteristics between transmitter and at least two or more receiver antennas. The technique was widely used in fixed microwave tower applications where the spacial separation of the antennas could easily be obtained.

In the 900 MHz cellular radio environment, where the wavelength is on the order of thirteen inches, it is impractical to use space diversity for the personal communications receiver because it is difficult to achieve sufficient antenna separation. In these systems the separation would necessarily be greater than six inches to support space diversity and thus has simply not been practical. Mobile cellular phone applications in automobiles on the other hand may be configured to incorporate this concept.

Time diversity techniques are typically thought of as coding algorithms or other redundancy techniques where repeated transmission of information occurs over the same channel. These systems have not presented a practical solutions to the problem due to various system considerations.

Accordingly there is a need-in the field of mobile telecommunications for a solution to these and other problems which would allow for increased capacity of mobile telecommunications systems while minimizing both power and frequency use. Any practical solution to this problem would necessarily be easily transported by an individual.

SUMMARY OF THE INVENTION

It is an object of the present invention to provide an apparatus and method for improved modulation and demodulation of electromagnetic signals used in mobile telecommunications.

It is another object of the present invention to provide an apparatus and method that provides a better signal to noise ratio in mobile telecommunications circuitry.

It is a further object of the present invention to provide an apparatus and method which may be practically used in mobile personal telecommunications.

Other objects and advantages of the present invention will become apparent from the following summary, drawings, and detailed description of the invention and its preferred embodiment.

Although the application of this circuitry is considerably broader than its use in mobile telecommunications, this application is set forth to teach the best mode and manner of implementing the invention.

The foregoing and other objects of the invention are accomplished by a novel modulation/demodulation technique which provides a substantial performance improvement in phase and amplitude distorted channels typically encountered in mobile telecommunications. The novel modulation/demodulation technique is referred to as Fixed Reference Shift Keying (FRSK). FRSK is a frequency diversity solution to the problems encountered in mobile telecommunications and has particularly desirable characteristics for combatting variations in phase modulated digital communications.

This new technique employs the transmission of a pilot reference or tone signal along with a modulated carrier wave within a predetermined coherence band. The tone signal and the carrier are matched in amplitude at the transmitter to ensure that fade effects are consistent. The pilot and carrier signals should start from a stable common source of phase reference before modulation of the carrier occurs to improve the immunity to phase distortion imparted by the communication channel by removing noise effects at the source. Because the pilot tone and the carrier wave are transmitted within the same coherence band, the phase distortion of the tone signal should be the same as that of the carrier. The receiver separates these signals and applies instantaneous phase estimation techniques on the tone signal and modulated carrier wave. The relative phase measurement removes the phase distortion introduced by the channel because the phase relationship of the pilot tone and the carrier wave is substantially independent of the channel phase distortions as each signal is similarly distorted. This system therefore accounts for channel phase distortions such as the distortions caused by the multiplicative multipath effect.

Detection is accomplished by determining the phase angle of both the carrier and the tone signal on an instantaneous basis. Instantaneous phase estimation can be accomplished in several ways. One is through the use of a maximum likelihood phase estimation process using an inverse tangent function with appropriate modulus operations over $\pi$. Similar results should be possible using instantaneous phase estimation techniques that employ differentiation of the inverse tangent functions such as in speech processing that track the instantaneous differential phase and integrate this differential phase over the bit interval to obtain the phase estimate. The remainder of the detection process is a standard correlation receiver design that uses the instantaneous difference in phase angle as the decision statistic. As noted, this statistic is independent of the phase error introduced by the channel. Thus a large margin of immunity is introduced by using the relative phase of the carrier with respect to the tone signal.

When signals of different frequencies are transmitted the differing wavelengths cause a delay spread to occur (i.e., for the same path length, signals of different wavelengths will arrive at different phase angles). By convention, the frequency separation between two signals at which the correlation coefficient is equal to 0.5 is defined to be the coherence bandwidth. Typical coherence bandwidth values for mobile cellular radio channels are on the order of 50 kHz in urban areas. With a cellular radio channel bandwidth of 30 kHz, frequencies within the channel bandwidth assignment will be coherently or equivalently correlated within the assigned channel.

DETAILED DESCRIPTION OF THE INVENTION AND A PREFERRED EMBODIMENT

A transmitter sends out a phase modulated carrier wave and a reference tone signal which is within the coherence band assigned for each carrier wave. The tone signal and the carrier wave are matched in amplitude at the transmitter to ensure that fade effects are consistent. Additionally, the pilot and carrier signals should start from a stable common source of phase reference before the modulation of the carrier occurs to improve the immunity to phase distortion imparted by the communication channel by removing noise effects at the source. The receiver applies instantaneous phase estimation techniques on the received signals by using the difference between the instantaneous phase estimates of the pilot and carrier waveforms.

One method of obtaining the phase estimates for demodulation of the transmitted signals is to use digital signal processing techniques to calculate a real and an imaginary part of each received signal and then using a floating point inverse tangent function from a digital signal processor to obtain the phase. The real and imaginary parts of the received signal are estimated by multiplying the received signal by a cosine and sine function in two separate streams, adding these streams together, and performing digital integration over the bit interval (i.e., summing the values resulting from the point by point multiplication). These two values are input to an inverse tangent function on the digital signal processor to obtain the phase estimate.

Figure 1:
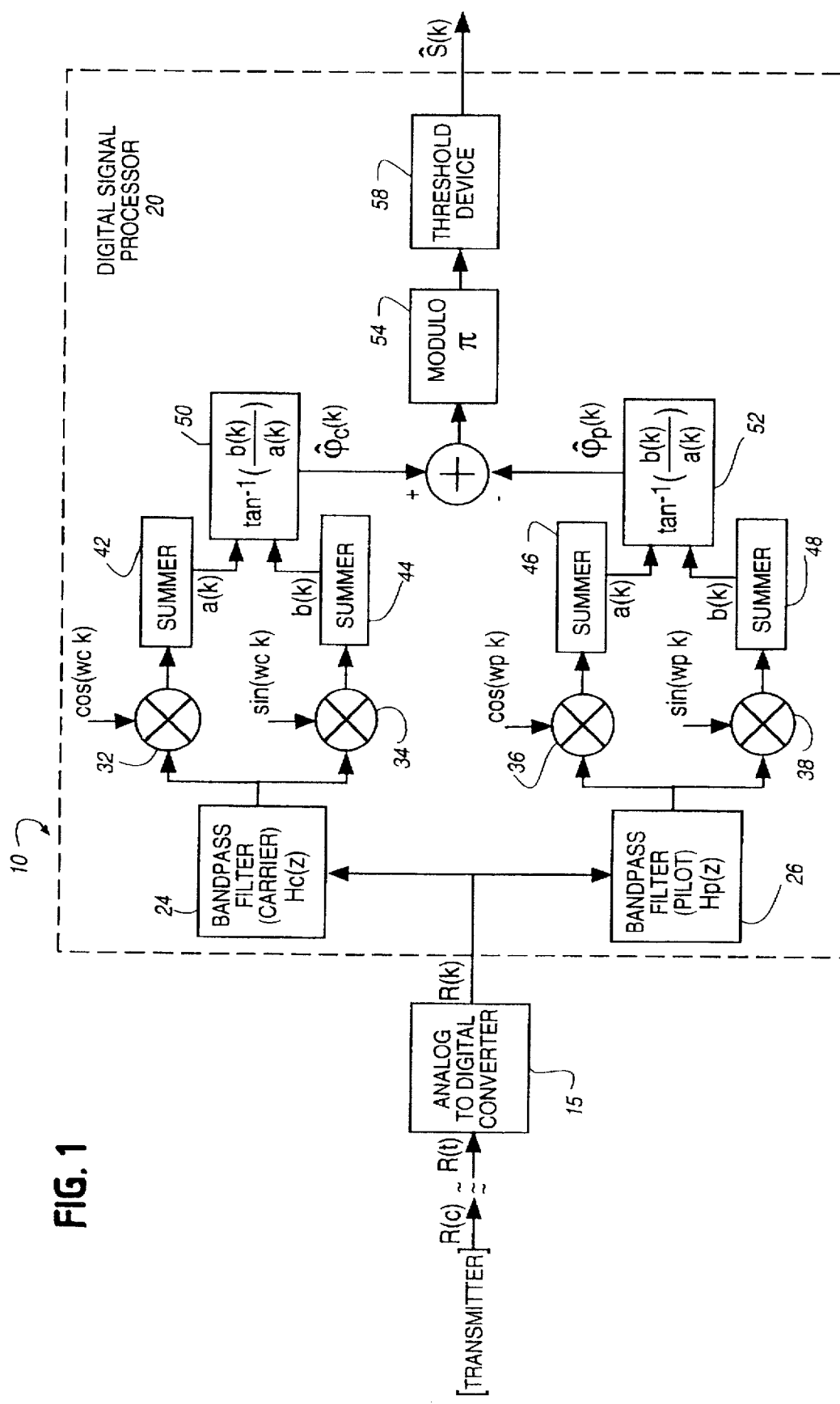
FIG. 1 is a block diagram of the receiver illustrating the functions performed in a digital signal processor for demodulation.

A more specific example of obtaining the phase estimates is set forth in FIG. 1. A receiver means for demodulating signals in accordance with the present invention is shown generally at 10. The receiver means receives both the carrier and tone signal which is transmitted within the coherence band assigned for the carrier wave. The modulated carrier wave and tone signal initially pass through an analog to digital converter 15 which has its digital output connected to a digital signal processor 20. The receiver for FRSK modulation can be conveniently implemented in a typical digital signal processing chip such as the TMS320 manufactured by Texas Instruments or the DSP32 manufactured by American Telephone and Telegraph as well as other equivalent chips. An input to the chip will be a digital signal R(k) and an output S(k) will comprise a single bit (if a binary phase shift keying. (BPSK) scheme is employed), two bits (if a quadrature phase shift keying scheme is used), etc. The operation of the demodulation scheme set forth in the digital signal processor is as follows.

A received signal R(t) is assumed to be: 1) converted to baseband, and 2) bandlimited by an analog antialiasing filter. The bandlimited signal R(t) is then applied to an analog to digital converter having a sampling rate sufficient to satisfy the Nyquist criterion, i.e., it must sample at a minimum frequency which is at least twice the maximum frequency of the bandlimited signal R(t). Output from the analog to digital converter is a digital signal R(k) that is then input to the digital signal processor 20.

A first operation of the digital signal processor 20 separates the modulated carrier wave and the pilot signal from the input signal R(k) through bandpass filters indicated at 24 and 26. This can be accomplished by using digital linear-phase finite impulse response filters (FIR). The filters are linear-phase filters to maintain phase information that is relied upon for estimating channel distortions and other information. The outputs of each filter are applied to two pairs of multipliers indicated at 32, 34, 36, and 38. One pair, 32, 34 processes the carrier signal and the other pair, 36, 38 processes the pilot signal. One of the multipliers from the respective pairs multiplies its respective signal by the sine function and the other multiplies the signal by the cosine function. The arguments of the sine and cosine functions will be a function of the carrier and pilot frequency. The signals from the multipliers are then applied to accumulators, i.e., summers, 42, 44, 46 and 48, which implement an integration for a digital signal. The summer outputs, a(k) and b(k), correspond to the Fourier coefficients for the input signals. The inverse tangent of b(k)/a(k) provides an estimate of the instantaneous phase for that signal at sample k. These functions are indicated at 50 and 52. It will be appreciated that this procedure can be used to obtain the phase estimates of the carrier, $\phi_c(k)$, and the pilot $\phi_p(k)$.

The carrier phase estimate $\phi_c(k)$ will comprise a summation of the phase due to the transmitted signal, i.e., a multiple of pi, and the phase due to the channel variations. Because the pilot phase estimate $\phi_p(k)$ contains an estimate of the channel variation only, which should be the same distortion undergone by the carrier, the difference between these two carrier and pilot phase estimates provides an estimate of the modulated phase information. This difference is applied to a modulo $\pi$ operator 54 to produce an output between zero and one. For digital BPSK (Binary Phase Shift Keying) signals, "zero" transmitted signals should be roughly zero, and "one" transmitted signals should be roughly one. Therefore a threshold device 58 for BPSK signals would output a one if the output from the modulo $\pi$ operator is above 0.5, and zero otherwise. The thresholds for multiple Phase Shift Keying (MPSK) signals can be determined in a similar fashion. The output of the threshold device S(k) will correspond to the estimate of the information transmitted for sample k.

Figure 2:
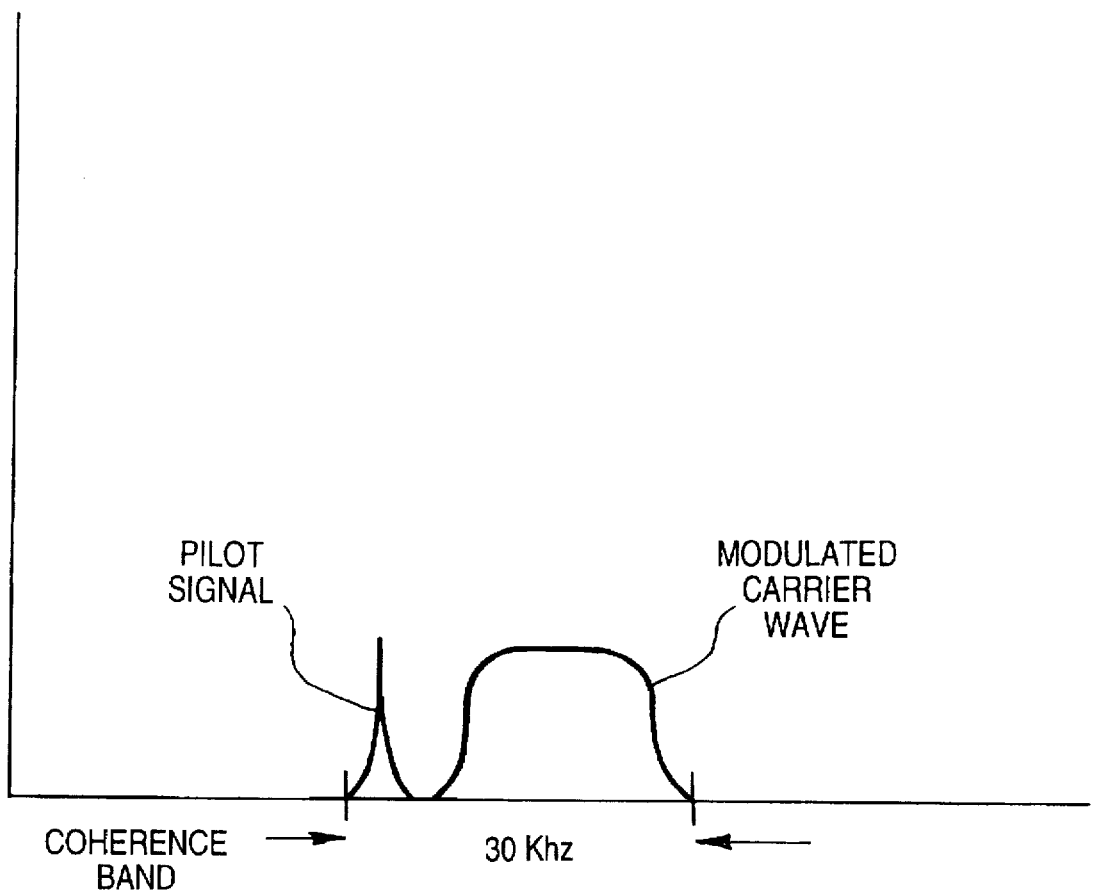
FIG. 2 is a graphical representation of a pilot tone signal and a modulated carrier wave within channel bandwidth assignment.

Referring to FIG. 2, a graphical representation of a pilot tone signal and a modulated carrier wave within channel bandwidth assignment is illustrated. In accordance with the present invention, a transmitter sends out a phase modulated carrier wave and a reference tone signal within a coherence band of a carrier wave. With a cellular radio channel bandwidth of 30 kHz, frequencies within the channel bandwidth assignment are coherently or equivalently correlated within the assigned channel. Accordingly, as illustrated in FIG. 2, the pilot signal and the modulated carrier wave are within the 30 kHz channel bandwidth of the coherence band.

While the invention has been particularly shown and described with reference to a preferred embodiment, it will be understood by those skilled in the art that variations in form, construction and arrangement may be made therein without departing from the spirit and scope of the invention. All such variations are intended to be covered in the appended claims.

What is claimed is:

1. A phase modulated communication system including:
    transmitter means for transmitting a phase modulated carrier wave and a tone signal, the tone signal being within 1 coherence band of the carrier wave; and
    a receiver means for receiving the transmitted tone signal and phase modulated carrier wave; wherein
    the receiver means includes means for separating the tone signal and phase modulated carrier wave and means for estimating the instantaneous phase of the tone signal and phase modulated carrier wave to obtain a relative phase measurement between the tone signal and the phase modulated carrier wave.

2. The phase modulated communication system of claim 1, wherein the tone signal is at a lower frequency within the coherence band of the phase modulated carrier wave.

3. The phase modulated communication system of claim 1, wherein the tone signal is at a higher frequency within the coherence band of the phase modulated carrier wave.

4. The phase modulated communication system of claim 1, wherein the means for estimating the instantaneous phase of the tone signal and phase modulated carrier wave includes application of an inverse tangent function.

5. The phase modulated communication system of claim 1, wherein the transmitter is a transmitter in a digital cellular telephone communications network.

6. The phase modulated communication system of claim 1, wherein the receiver means is a cellular telephone.

7. The phase modulated communication system of claim 1, wherein the means for estimating the instantaneous phase of the tone signal and phase modulated carrier wave includes integration of a differential phase over a bit interval to obtain phase estimates.

8. The phase modulated communication system of claim 1, wherein the transmitter means is a cellular telephone exchange.

9. The phase modulated communication system of claim 1, wherein the means for estimating the instantaneous phase of the received tone signal and the received phase modulated carrier wave each includes: means for multiplying each received signal, sample by sample, by cosine and sine functions, said means for multiplying electrically coupled to a summer for summing the sample by sample multiplication over a bit interval, said summer electrically coupled with and supplying two arguments to a means for performing an inverse tangent function thereby outputting a respective result for the tone signal and carrier wave.

10. The phase modulated communication system of claim 9, further including means for differentiating the respective results for the tone signal and carrier wave thereby producing an estimate of phase modulation.

11. A receiver for receiving communications signal, the receiver including:

means for receiving a transmitted tone signal and a phase modulated carrier wave wherein the tone signal is within the coherence band of the phase modulated carrier wave; and means for separating the tone signal and phase modulated carrier wave and means for estimating the instantaneous phase of the tone signal and phase modulated carrier wave to obtain a measurement of the relative phase between the phase modulated carrier wave and the tone signal.

12. The receiver for receiving a phase modulated carrier wave of claim 11 wherein the receiver is incorporated into a cellular telephone.

13. A method for reducing effects of distortion in a communication channel comprising the steps of:

transmitting a phase modulated carrier wave and a tone signal, the tone signal being within the coherence band of the phase modulated carrier wave;

receiving the tone signal and phase modulated carrier wave; and estimating the relative instantaneous phase of the phase modulated carrier wave and the tone signal to obtain a measurement of the relative phase between the phase modulated carrier wave and the tone signal.

14. The method for reducing effects of distortion in a communication channel of claim 13, wherein said step of estimating the relative instantaneous phase of the modulated carrier wave and the tone signal includes the steps of:

separating the tone signal and the phase modulated carrier wave;

splitting the tone signal into first and second separated tone signals and multiplying the first separated tone signal by a sine function and multiplying the second said separated tone signal by a cosine function to obtain respective tone signal resultants;

splitting the phase modulated carrier wave into first and second separated phase modulated carrier waves and multiplying the first separated phase modulated carrier wave by a sine function and multiplying the second separated phase modulated carrier wave by a cosine function to obtain phase modulated carrier wave resultants;

summing the respective tone signal resultants and performing the inverse tangent to obtain an instantaneous phase estimate for the tone signal; and summing the respective phase modulated carrier wave resultants and performing the inverse tangent function to obtain instantaneous phase estimates for the phase modulated carrier wave.

15. The method for reducing effects of distortion in a communication channel according to claim 14, further including the step of differentiating the instantaneous phase estimate of the tone signal and modulated carrier wave to provide an estimate of modulated phase information.

16. The method for reducing effects of distortion in a communication channel according to claim 15, further including the step of applying the estimate of modulated phase information to a modulo $\pi$ operator to produce an output between 1 and 0.

* * * * *